United States Patent
John, Jr. et al.

[11] Patent Number: 5,938,778
[45] Date of Patent: Aug. 17, 1999

[54] SYSTEM AND METHOD FOR TRACING INSTRUCTIONS IN AN INFORMATION HANDLING SYSTEM WITHOUT CHANGING THE SYSTEM SOURCE CODE

[75] Inventors: Chester Charles John, Jr., Round Rock; Robert J. Urquhart, Austin, both of Tex.

[73] Assignee: International Business Machines Corporation, Armonk, N.Y.

[21] Appl. No.: 08/967,651

[22] Filed: Nov. 10, 1997

[51] Int. Cl.⁶ .................................................. G06F 11/00
[52] U.S. Cl. .................................................................. 714/45
[58] Field of Search ............................... 395/500, 183.21

[56] References Cited

U.S. PATENT DOCUMENTS

| | | |
|---|---|---|
| 4,205,370 | 5/1980 | Hirtle . |
| 5,073,968 | 12/1991 | Morrison . |
| 5,446,876 | 8/1995 | Levine et al. . |
| 5,454,086 | 9/1995 | Alpert et al. ............................ 395/568 |
| 5,560,013 | 9/1996 | Scalzi et al. ............................ 395/705 |
| 5,574,937 | 11/1996 | Narain . |
| 5,671,402 | 9/1997 | Nasu et al. ............................... 395/500 |
| 5,701,486 | 12/1997 | Gilbertsen et al. ..................... 395/704 |

FOREIGN PATENT DOCUMENTS

03280134  12/1991  Japan .

*Primary Examiner*—Kevin J. Teska
*Assistant Examiner*—Ayni Mohamed
*Attorney, Agent, or Firm*—Leslie A.Van Leeuwen; Jeffrey S. LaBaw; Michele A. Mobley

[57] ABSTRACT

The present invention is directed to a system and method for tracing operations in an information handling system without changing the operating system code. Certain machine registers are shadowed during critical machine state transitions (e.g., taking and returning from interrupts), so that the tracing program does not lose control of the system. The system is interrupted before each instruction is executed, and a tracing program determines if a change in program flow has occurred. If a change in program flow has occured, a record is written to a trace log. The record contains the number of consecutive instructions executed before the program flow change, along with a displacement field indicating the number of bytes from the end of the record to the beginning of the next record. Executed instructions are also embedded in the trace log, allowing for high compression ratios and less complex post-processing of the trace data.

24 Claims, 7 Drawing Sheets

FIG. 1A

Virtual Machine in Intel Architecture normal:

FIG. 1B

Virtual Machine in operation

Decode Instructions

FIG. 6

Summary Report

FIG. 7

SYSTEM AND METHOD FOR TRACING INSTRUCTIONS IN AN INFORMATION HANDLING SYSTEM WITHOUT CHANGING THE SYSTEM SOURCE CODE

FIELD OF THE INVENTION

The present invention relates to information processing systems and, more particularly, to software tools and methods for monitoring, modeling, and enhancing system performance.

BACKGROUND OF THE INVENTION

To enhance system performance, it is helpful to know which modules within a system are most frequently executed. These most frequently executed modules are referred to as "hot" modules. Within these hot modules, it is also useful to know which lines of code are the most frequently executed. When there is a point in the code where one of two or more branches may be taken, it is useful to know which branch is the mainline path, or the branch most frequently taken, and which branch or branches are the exception branches.

A programmer hoping to improve system performance should focus his or her efforts on improving the performance of the hot modules and the most frequently executed lines of code within the hot modules. Improving the performance of the most frequently executed modules and code segments will have the most effect on improving overall system performance. It does not make sense to spend much time improving the performance of modules and code segments which are rarely executed, as this will have little, if any, effect on the overall system performance.

A programmer hoping to improve the performance of a module will group the instructions in the mainline branches of the module closely together. Keeping the mainline code packed closely together increases the likelihood of cache hits, since the mainline code is the code that will most likely be loaded into the instruction cache.

Performance tools are used to examine program code to determine the most frequently executed modules and instructions in a system. Performance tools may be implemented in hardware or software. Hardware performance tools are usually built into the system. Software performance tools may be built into the system or added at a later point in time. Performance tools implemented in software are especially useful in systems, such as personal computer systems, that do not contain many, if any, built-in hardware performance tools.

Some prior art software performance tools use an interrupt-driven method to monitor performance. Typically, the system is interrupted at set time intervals. At each interrupt, the performance tool samples the code that is running and adds data into a log.

There are several problems with this prior art approach. Because the code is sampled once per interrupt, the programmer never sees any data pertaining to code that is "disabled for interrupts" (i.e. code where interrupts are masked). The interrupt that stops the system and allows the performance monitoring to take place can never occur during code that is disabled for interrupts.

Another problem with this prior art approach is that the storage area quickly fills with data. This means the performance tool can only be run for a very short period of time, or the tool must stop the system to unload the data into another space, such as to disk. Stopping the system is very intrusive, as this type of stop would not occur during normal operations. Thus, stopping the system to unload performance data actually affects the system performance of the system that is being monitored.

Furthermore, sampling once per interrupt gives a ragged view of the performance data. It is difficult to accurately understand what is happening in the system because the performance data is collected at random points. There is no data collected pertaining to a sequence of instructions running in the consecutive order in which they were intended to execute.

Another type of prior art software performance tool keeps track of sequences of instructions by logging every instruction as it executes. However, there are several problems associated with this type of prior art approach. First, the storage area fills with data even more quickly than with the interrupt-driven performance tool. Therefore, this type of tool can only be run for very short periods of time, or the data must be unloaded to another storage area so often that the tool becomes prohibitively intrusive. Another problem with this type of tracing tool is that it typically requires changes, or "hooks," in the operating system code. There are often situations where a developer wishes to trace the instructions executing in an information handling system, but does not have access to the operating system code.

Consequently, it would be desirable to have a tracing tool that would accurately depict the instruction flow of code executing in an information handling system without requiring any changes to be made to the operating system code. It would also be desirable to have a tracing tool that did not require a large memory area in which to store data.

SUMMARY OF THE INVENTION

Accordingly, the present invention is directed to a system and method for tracing operations in an information handling system without changing the operating system code. The present invention allows both instruction and data tracing to be performed on the operations of an information handling system. The present invention creates a "virtual machine layer" above the operating system. The virtual machine layer shadows certain machine registers during critical machine state transitions (e.g., taking and returning from interrupts), so that the tracing program does not lose control of the system.

The system is interrupted before each instruction is executed. The tracing program determines if a change in program flow has occurred by adding the length of the previous instruction to its starting address, and comparing this result to the current instruction address. If a change in program flow has occurred, a record is written to a trace log. The record contains the number of consecutive instructions executed before the program flow change, along with a displacement field indicating the number of bytes from the end of the record to the beginning of the next record. Executed instructions are also embedded in the trace log, allowing for high compression ratios and less complex post-processing of the trace data.

One embodiment of the present invention is an information handling system capable of performing the method described above. Another embodiment of the present invention is as sets of instructions resident in an information handling system.

An advantage of the present invention is that instruction and data tracing may be performed without changing the operating system code. Another advantage of the present invention is that the trace log is very compact, allowing significant amounts of instruction and data tracing information to be stored in less space than prior art methods. A further advantage of the present invention is that instructions are stored in the trace log, enabling efficient and less complex post-processing of the trace data.

BRIEF DESCRIPTION OF THE DRAWINGS

The foregoing and other features and advantages of the present invention will become more apparent from the detailed, description of the best mode for carrying out the invention as rendered below. In the description to follow, reference will be made to the accompanying drawings, where like reference numerals are used to identify like parts in the various views, and in which.

DETAILED DESCRIPTION OF A PREFERRED EMBODIMENT OF THE INVENTION

Figure 1A:
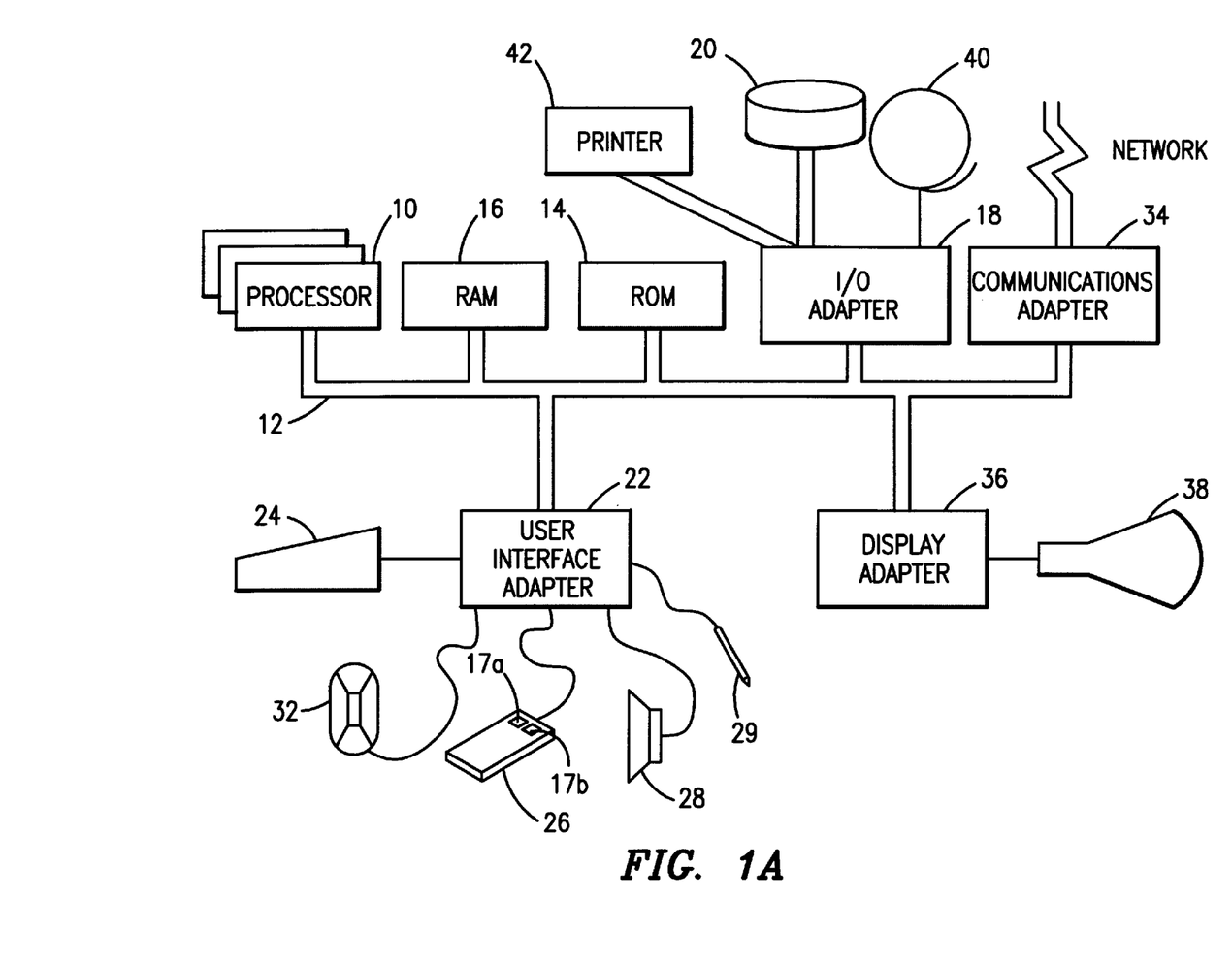
FIG. 1A is a block diagram of an information handling system capable of executing the tracing method of the present invention.

The invention may be implemented on a variety of hardware platforms, including personal computers, workstations, mini-computers, and mainframe computers. Many of the steps of the method according to the present invention may be advantageously implemented on parallel processors of various types. Referring now to FIG. 1A, a typical configuration of an information handling system that may be used to practice the novel method of the present invention will be described. The computer system of FIG. 1A has at least one processor 10. Processor 10 is interconnected via system bus 12 to random access memory (RAM) 16, read only memory (ROM) 14, and input/output (I/O) adapter 18 for connecting peripheral devices such as disk units 20 and tape drives 40 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38.

Communication adaptor 34 may link the system depicted in FIG. 1A with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

Figure 1B:
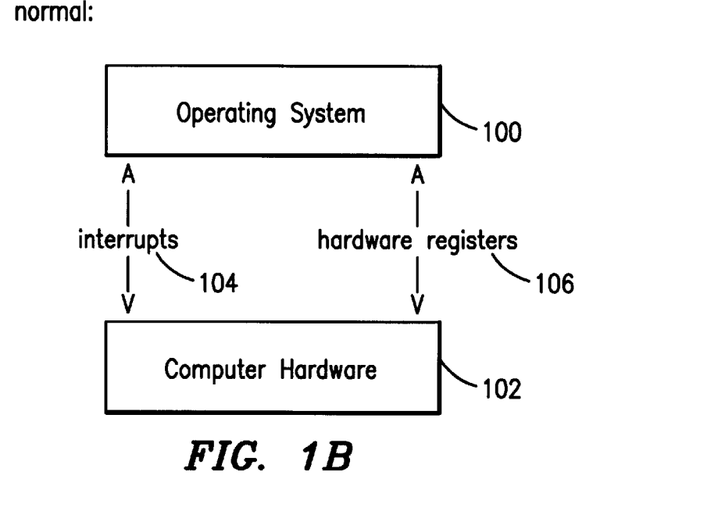
FIG. 1B is a block diagram of an information handling system operating system in Intel architecture.

FIG. 1B shows a block diagram of an information. handling system operating system in Intel architecture. FIG. 1B shows operating system 100 and computer hardware 102. Interrupts 104 between the computer hardware 102 and the operating system 100 are handled in one of three ways. Interrupts 104 either are (1) passed unmodified between the computer hardware 102 and the operating system 100, or (2) passed between the two with modifications, or (3) generated or absorbed by the virtual machine layer 112 (shown in FIG. 1C). An example of a modified interrupt is a timer interrupt.

Figure 1C:
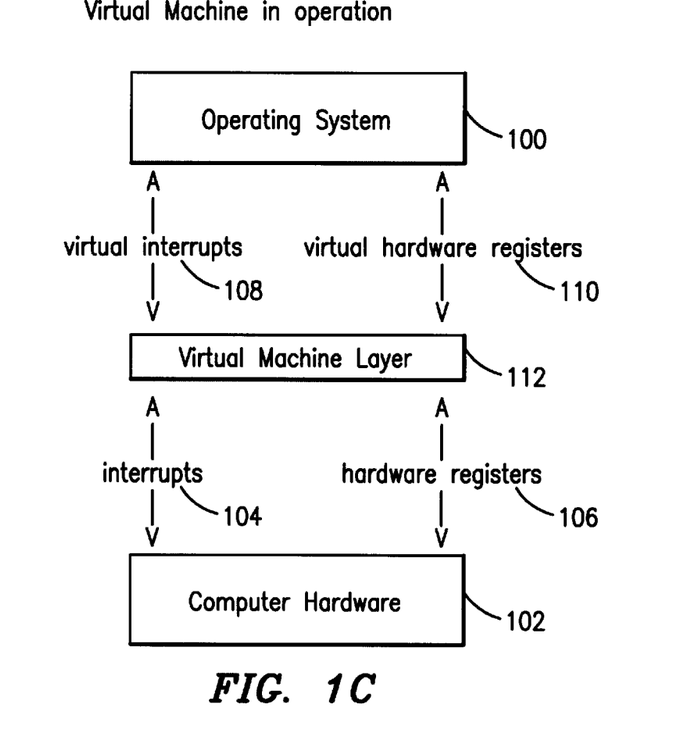
FIG. 1C is a block diagram of an information handling system operating system showing a virtual machine layer in Intel architecture.

FIG. 1C shows a block diagram of an information handling system operating system showing a virtual machine layer 112. In FIG. 1C virtual interrupts 108 and virtual hardware registers 110 pass between operating system 100 and virtual machine layer 112. Interrupts 104 and hardware register 106 pass between virtual machine layer 112 and computer hardware 102. Interrupts 104 are handled in one of three ways, as previously described. Hardware registers 106 may be required to be emulated in the virtual machine layer 112. This is done by emulating the instructions that modify the registers 106. Some examples for Intel information handling systems include: interrupt vector table and its base register, control registers, EFLAGS, debug registers, segment registers, global descriptor table and its base register, local descriptor table and its base register, and task state segment. The virtual machine layer 112 generally shadows hardware registers 106 and detects state transitions. Note that because of its supervisor architecture, a virtual machine for Intel information handling systems usually requires single stepping of instructions.

The unique method of the present invention allows instruction and data tracing to be performed on the operations of an information handling system, such as the information handling system described in FIGS. 1A–1C. The tracing can be performed with no changes to the underlying operating system code. This is useful in the case where the developer wishing to perform the tracing does not have access to all or part of the operating system code.

The present invention creates a "virtual machine layer" above the operating system. As described with reference to FIG. 1C, the virtual machine layer shadows certain machine registers during critical machine state transitions (e.g., taking and returning from interrupts), so that the tracing program does not lose control. Another feature of the present invention is that executed instructions are embedded in the trace log, allowing for high compression ratios and less complex post-processing of the trace data.

The concept of having a virtual machine layer (VML) to shadow critical machine state transitions can be used in several ways. An existing communications mechanism, such as a serial port, could communicate with the machine with a VML and thereby control for the purpose of:

testing of the Operating System (OS) running on the machine;

monitoring of the OS for performance, resource, usage, or functionality checks;

creating test scenarios of hard to duplicate error conditions (i.e. machine checks);

supporting multiple OS on the machine;

emulating multiple hardware configurations below a multi processor based OS;

emulating new or modified instruction set definitions before availability of hardware support.

Figure 2:
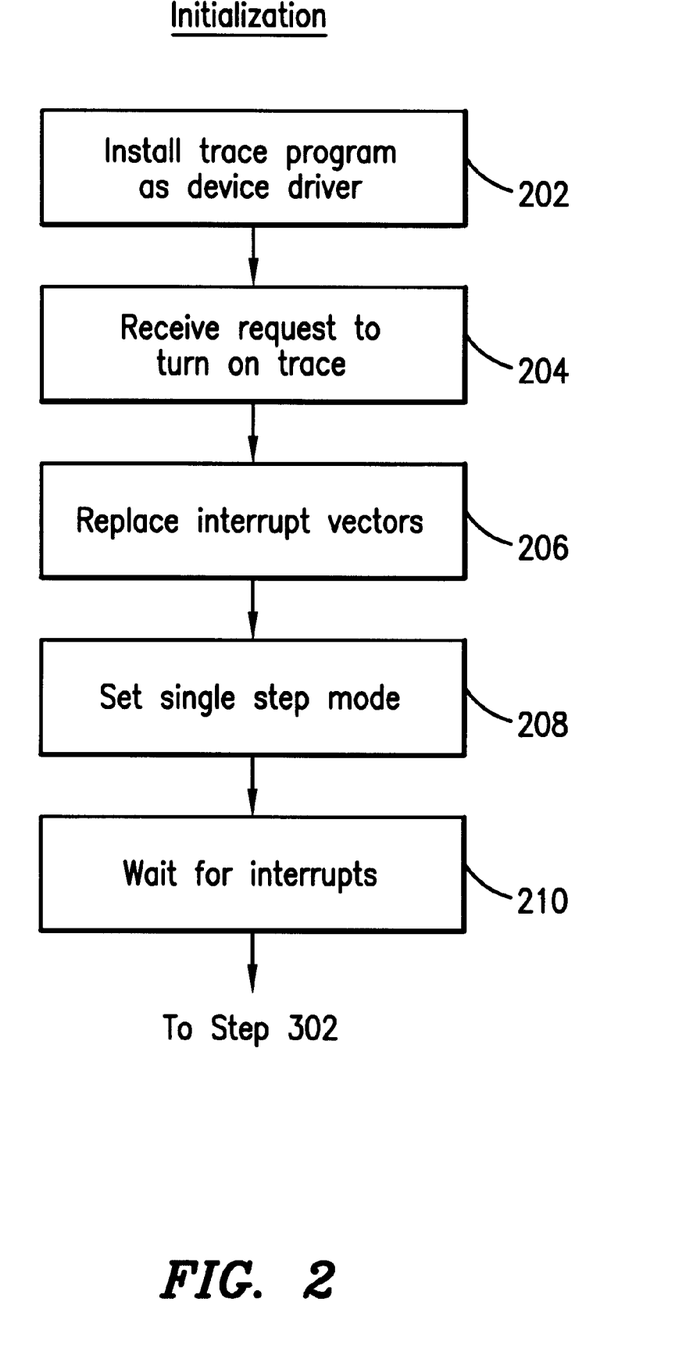
FIG. 2 is a flow chart illustrating a method for initializing the tracing of the present invention.

Referring now to FIG. 2, a method for initializing the tracing program of the present invention will be described. As shown in FIG. 2, the first step is to install the tracing program (step 202). In the described embodiment, the tracing program is installed as a device driver. This allows the tracing program to execute in supervisor mode (i.e. ring 0 in Intel architecture machines). When a request is made to begin tracing (step 204), the tracing program replaces the entire interrupt vector table to give control to the tracing program (step 206). Single stepping is then enabled (step 208), so that a single step interrupt will occur before execution of each, instruction. The tracing program then waits for interrupts (step 210).

Figure 3A:
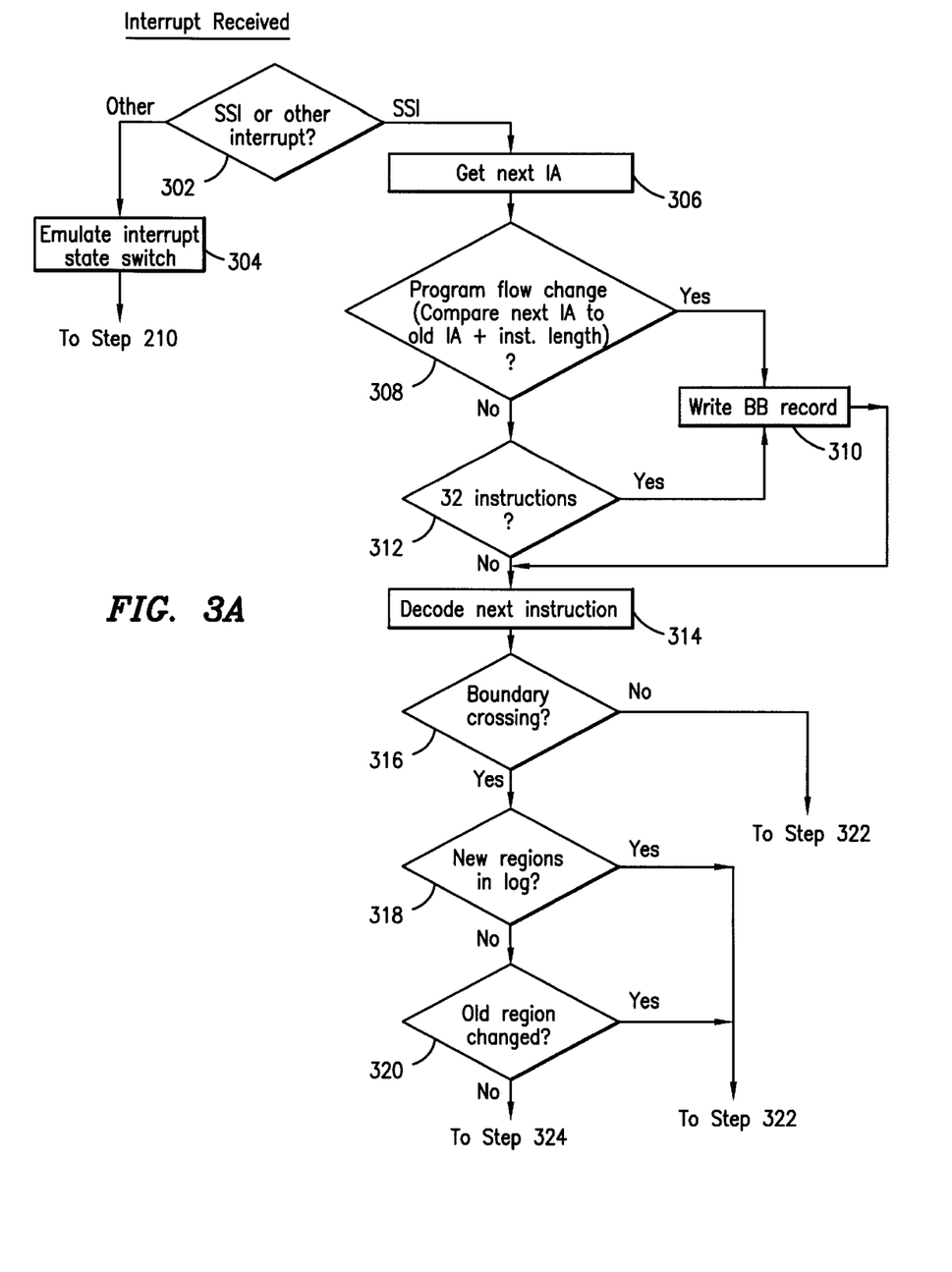
FIGS. 3A and 3B are flow charts illustrating a method for tracing the operations of an information handling system according to the teachings of the present invention.
Figure 3B:
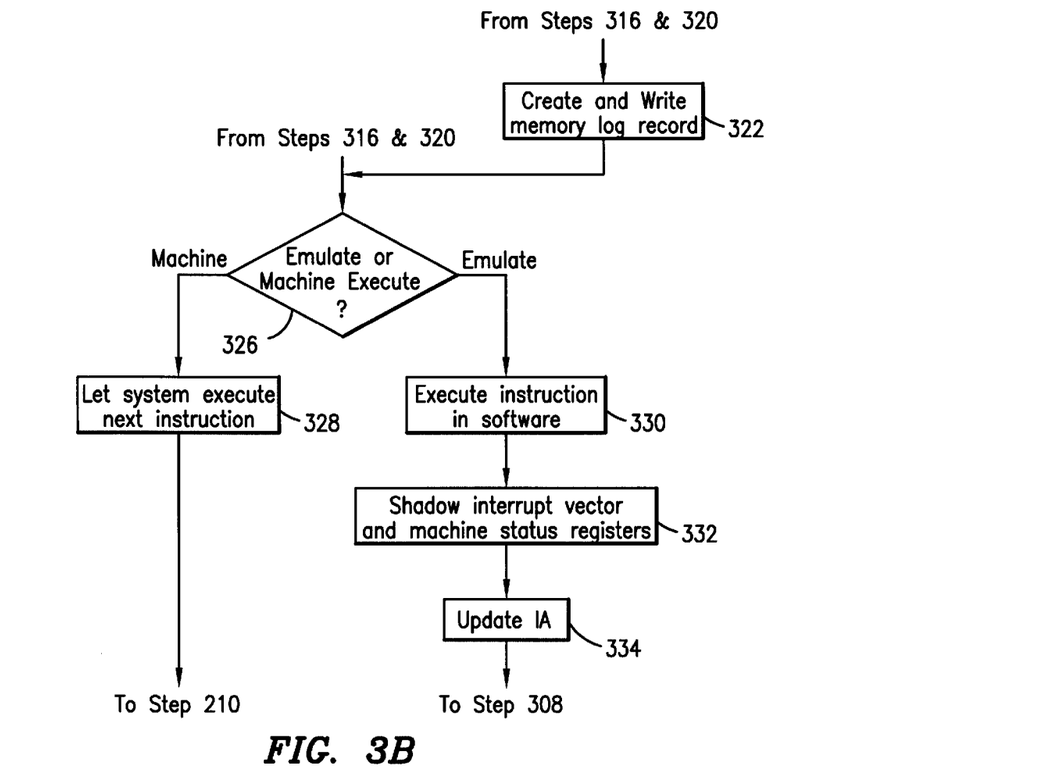

Referring now to FIGS. 3A and 3B, a method for using the single-step interrupt to trace the operations in the information handling system will now be described. Whenever an interrupt occurs, the tracing program gets control. The tracing program first checks to see if the interrupt is a single-step interrupt or some other type of interrupt (step 302). If the interrupt is any interrupt other than a single-step interrupt, the tracing program emulates the interrupt state switch (step 304), and then resumes waiting for interrupts (step 210 in FIG. 2). Interrupt state switches are emulated by the tracing program so that it does not lose control to another program when an interrupt occurs.

If the interrupt which occurs is the single-step interrupt, the tracing program reads the address of the instruction which is about to be executed (step 306). The tracing program then determines if a program flow change has occurred (step 308). The tracing program determines this by adding the instruction address of the last instruction executed to the length of the last instruction executed. The sum of the last instruction address and the last instruction, length is referred to as the expected address. If the instruction address of the next instruction to be executed, does not equal the expected address, a change in program flow has occurred. If this is the case, a "basic block" is written. (step 310). Details of encoding and writing a basic block and embedding instructions in the trace log are described below. If there has been no change in program flow, but 32 consecutive instructions have been encountered (step 312), a basic block is also written (step 310). Note that while 32 instructions are used in the described embodiment, any number of instructions may trigger the writing of a basic block.

If there has been no change in program flow and fewer than 32 instructions are currently in the basic block, the tracing program decodes the instruction which is about to be executed (step 314). The instruction is decoded to determine both the type of instruction and its length.

The encoding of basic blocks is one important key to the high compression rate achieved by the present invention. A basic block is a consecutive set of executed instructions. As shown in FIG. 3, it is terminated by one of two conditions:

1. The next instruction address is not immediately following the end of the previous instruction (step 308), or
2. Thirty-two instructions are in the block (step 312).

This encoding, in turn, depends upon the instructions being embedded in the trace log. In the described embodiment of the present invention, memory is divided into 128-byte regions. When the end of a basic block occurs (step 310), the tracing program determines which 128-byte areas of memory are included in the basic block. If a region has either not previously been written into the trace log or has changed since it was previously written, the executable instructions in the new region are written into the trace log.

A bit map is maintained with one bit per memory region. If the tracing program determines that a boundary crossing into a new memory region has occurred (step 316), the tracing program then checks the bit map to determine if the new region being entered has ever been written into the trace log (step 318). If the new region has not yet been written into the trace log (i.e. the answer to step 318 is "yes") then the 128 bytes in the region are written into the trace log (step 322). If the newly entered region has already been written into the trace log (i.e. the answer to step 318 is "no"), the tracing program then compares the 128 bytes in the trace log to the current state of the 128 bytes in each memory region (step 320). It is possible that one or more of the memory regions; have changed due to dynamic code modification. If this has occurred, the 128 bytes are again written to the trace log (step 322). As described below, the post-processing of the trace information is more efficient if the instructions are embedded in the trace log.

In the described embodiment, the first byte of each basic block is encoded to provide a variable length record that supports many different functions. For instruction trace compression, the four types of log records are as follows:

| Function | Record Length | Distance to next BB |
| --- | --- | --- |
| BB Type0 | 1 | 0 |
| BB Type1 | 2 | $-2^{}7$ to $+2^{}7$ |
| BB Type2 | 3 | $-2^{}15$ to $+2^{}15$ |
| BB Type4 | 5 | Absolute 32-bit address |

The first byte of each log record is defined as follows:

Bit 0 (most significant bit): 0

Bits 1–2: Mode bits

00 - 1 byte displacement to follow

01 - 2 byte displacement to follow

10 - 4 byte displacement to follow

11 - No displacement

Bits 3–7: Number of instructions in the basic block – 1

Using the above format, a basic block of up to 32 consecutive instructions can thus be encoded in one, two, three, or five bytes, depending on the distance from the end of the block to the beginning of the next block. For example, if the distance is between −128 and +127 bytes, basic block Type1 format is used. For distances in the range of $-2^{}15$ and $+2^{}15$, basic block Type2 is used. For larger ranges, basic block Type4 is used, providing a full 32-bit address.

Basic block Type0 has two uses. This first is for handling basic blocks that are greater than 32 instructions. For example, if a 40 instruction block is encountered, the first 32 instructions are encoded in a first basic block and the next eight instructions are encoded in a second basic block. The first basic block (i.e. the one covering the first 32 instructions) is a Type0 basic block, as the distance between it and the next basic block (i.e. the one covering the next eight instructions) is zero.

The second use for the Type0 basic block is during data tracing. To perform data tracing, the address (or addresses) of each piece of data is recorded. For example, if an instruction uses two pieces of data, the addresses of these two pieces of data are each stored in a separate basic block. In this case there are many adjacent basic blocks which can use the one-byte format.

Still referring to FIGS. 3A and 3B, the next step is to record the BB data in a buffer (step 324), and then determine if the information handling system should execute the next instruction, or if the next instruction should be emulated by the tracing program (step 326). Certain instructions, such as trap or jump instructions, could cause the tracing program to lose control, and so these particular instructions are emulated by the tracing program (step 330). The emulation is accomplished by shadowing the interrupt vector and machine status registers (step 332), and then updating the instruction address (step 334). The tracing program then returns to step 308 in FIG. 3A. If the instruction can not cause the tracing program to lose control or to change a shadowed mask register, it is simply executed by the information handling system (step 328), and then the tracing program returns to step 210 in FIG. 2 to wait for the next interrupt.

Figure 4:
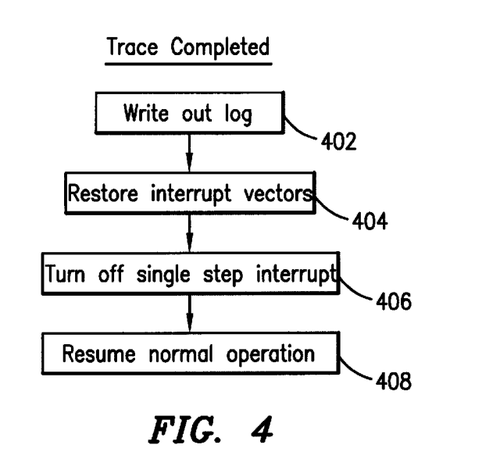
FIG. 4 is a flow chart illustrating a method for ending the tracing of the present invention.

Referring now to FIG. 4, a method for turning off the tracing program of the present invention will now be described. Tracing may be stopped by using a program or interrupt service routine to set a flag in a shared memory area, or may be stopped when the trace buffer is full. In either case, the trace log is written from the trace buffer to a file (step 402). The previous interrupt vectors are restored (step 404), the single-step interrupt is disabled, (step 406), and normal operations resume (step 408).

In the described embodiment, the post-processing of the trace information is very efficient because the executed, instructions are embedded in the trace log (as described above, with reference to FIGS. 3A and 3B). If the executed, instructions were not embedded in the trace log, then the, instructions would have to be determined during the post-processing phase. This would be difficult as executable, images are often compressed before being stored on a medium, such as a disk. Furthermore, when code is loaded, it is often changed by the loader. By writing the executed instructions directly into the trace log, the post-processing phase does not have to be concerned with compression, loader changes, or dynamically modified instructions.

Figure 5:
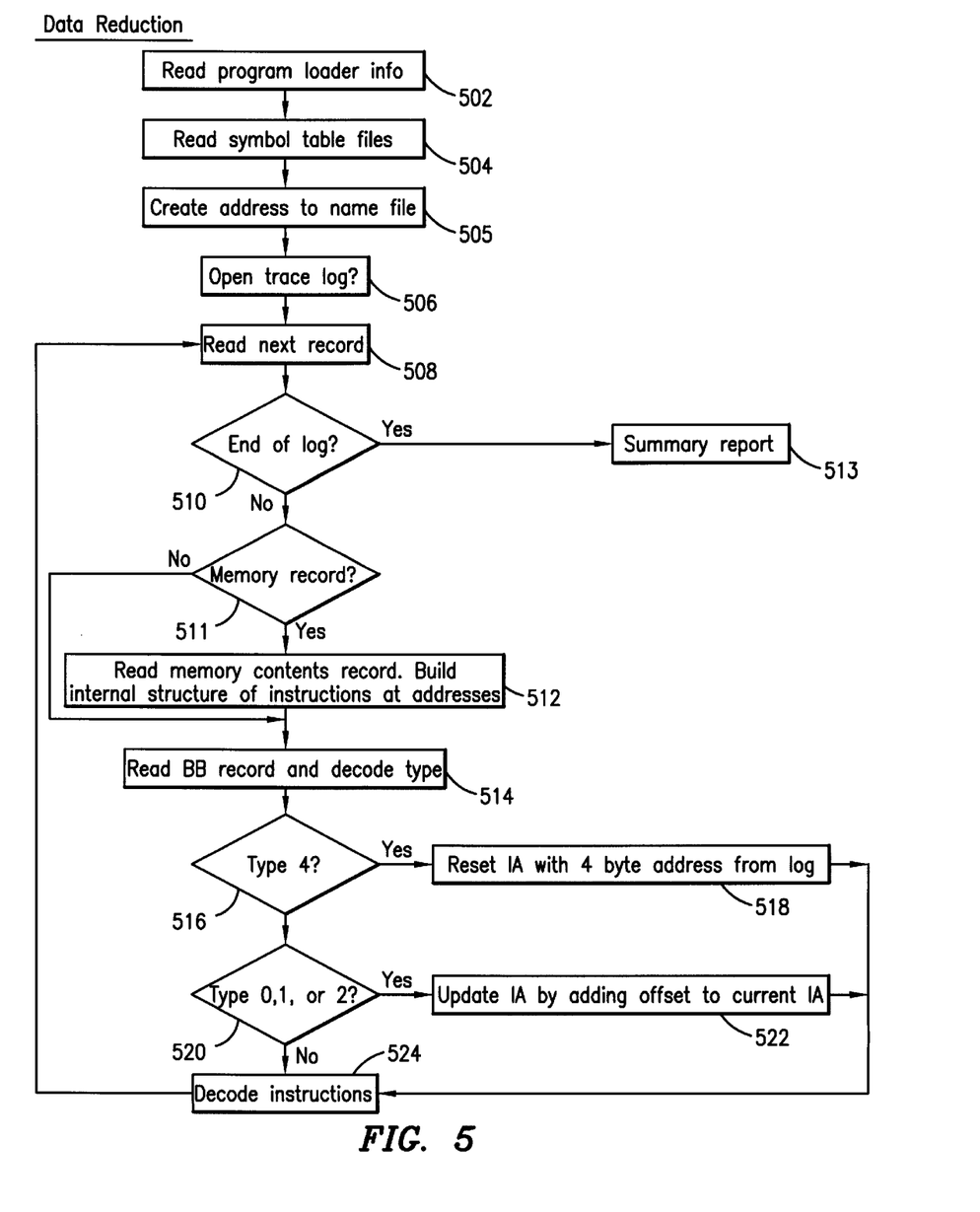
FIG. 5 is a flow chart illustrating a method for interpreting the data stored by the tracing program of the present invention.

A method for interpreting the trace log during a post-processing phase is illustrated in FIG. 5. Referring now to FIG. 5, the first step is to read the program loader information (step 502). Typical program loader information includes the name and starting address of each module loaded in the system. Next, the symbol table files are read to obtain an offset for any named data (e.g., constants) (step 504). The information read from the program loader files and the symbol table file allows an "address to name" file to be created (step 505) which can be used during the post-processing phase. The trace log file is then opened (step 506) and the first record is read (step 508). While there is more data to read (step 510), the post-processing program reads the memory contents record (step 512). If the end of the log has been reached, a summary report is written (step 513). More details regarding this step are described below with reference to FIG. 7. The memory contents record contains the first 128 bytes of instruction data stored in the trace log. The post-processing program uses this instruction data to build an internal structure of instructions and instruction addresses. Next, the post-processing program, reads a basic block and determines its type (step 514). If it is a basic block Type4 (step 516), the instruction address is reset with the appropriate 4-byte instruction address from the log (step 518). If it is a basic block Type0, basic block. Type1, or basic block Type2 (step 520), the instruction address is updated by adding the appropriate offset to the current instruction address (step 522). For example, if the current address is 100, and the offset in the basic block is 50, the instruction address is updated to become 110. The instruction is then decoded (step 524). Further details regarding this step are described below with reference to FIG. 6.

Figure 6:
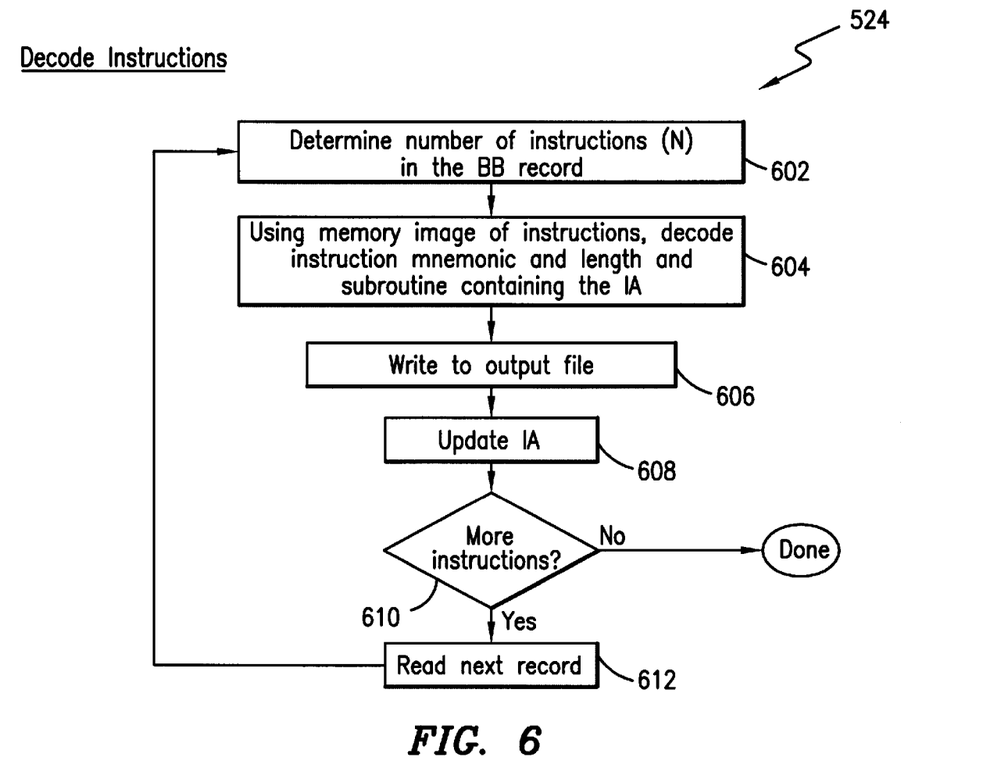
FIG. 6 is a flow chart illustrating a method for decoding instructions during the interpreting process depicted in FIG. 5.

Referring now to FIG. 6, a method for decoding instructions (step 524 in FIG. 5) will now be described. The post-processing program first reads bits 3–7 of the first byte of the basic block (step 602). Bits 3–7 are equal to one less than the number of instructions in the block. By using the memory image of the instructions (saved in step 512 of FIG. 5), the post-processing program decodes each instruction, its length, and the subroutine containing the instruction (step 604). This information is written to an output file (step 606). The current instruction address is updated (step 608), and the post-processing program then checks to see if there are more instructions (step 610). If there are more basic blocks, the post-processing program reads the next block (step 612). If not, the decoding step is complete.

Figure 7:
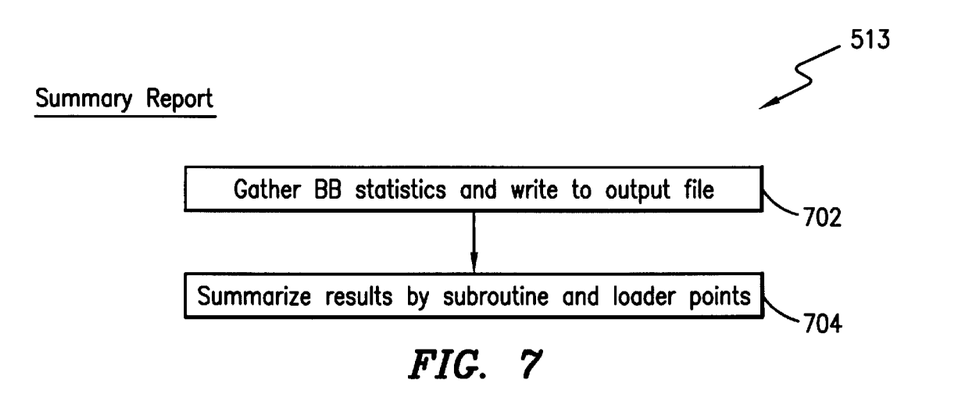
FIG. 7 is a flow chart illustrating a method for writing a summary report according to the present invention.

Referring now to FIG. 7, a method for writing a summary report (step 513 in FIG. 5) will now be described. The basic block information is gathered and written to an output file (step 702). The information may be summarized by using the "address to name" file discussed above (step 704).

In a current implementation of the described embodiment, it was found that approximately 40% of the basic blocks were Type1 basic blocks, 40% were Type2 basic blocks, 20% were Type4 basic blocks, and less than 1% were Type0 basic blocks. The average memory space used was 0.4 bytes per instruction, and the embedded instructions used less than 10% of the trace log.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. A method for tracing operations in an information handling system, comprising the steps of:

creating a virtual machine layer between an operating system and hardware of the information handling system;

shadowing identified machine registers during machine transition states using the virtual machine layer;

determining by a tracing program if a change in program flow has occurred, wherein said determining step includes the following steps:

reading a first instruction address of a first instruction;

calculating a length of the first instruction;

adding the first instruction address to the length of the first instruction to determine an expected address;

comparing the expected address to the next instruction address; and if the expected address is not equal to the next instruction address, concluding that a change in program flow has occurred; and writing a trace record to a trace log if a change in program flow has occurred.

2. A method for tracing according to claim 1, wherein the trace record contains a number of instructions executed and a displacement to a next trace record.

3. A method for tracing according to claim 1, wherein said writing step further comprises the step of writing one or more executable instructions into the trace log.

4. A method for tracing according to claim 1, further comprising the step of writing the trace log to an output file.

5. An information handling system, comprising:
   one or more processors;
   memory means for storing instructions and data for use by the processors;
   one or more images of an operating system for controlling the operation of the processors;
   an input/output system for communicating information to and from peripheral devices;
   at least one system bus connecting the elements of the system for efficient operation;
   a virtual machine layer between an operating system and hardware of the information handling system, the virtual machine layer for shadowing an identified machine register during processor transition states;
   reporting means for providing processor transition state information to a requesting process;
   a tracing program for determining if a change in program flow has occurred; and
   a trace log in which trace records are written if a change in program flow has occurred.

6. An information handling system according to claim 5, wherein said means for determining comprises:
   means for reading a first instruction address of a first instruction;
   means for calculating a length of the first instruction;
   means for adding the first instruction address to the length of the first instruction to determine an expected address;
   means for comparing the expected address to the next instruction address; and
   means for concluding that a change in program flow has occurred.

7. An information handling system according to claim 5, wherein the trace record contains a number of instructions executed and a displacement to a next trace record.

8. An information handling system according to claim 5, wherein said means for writing further comprises means for writing one or more executable instructions into the log.

9. An information handling system according to claim 5, further comprising means for writing the trace log to an output file.

10. A computer readable medium, comprising:
    means for shadowing identified machine registers during machine transition states;
    means for determining by a tracing program if a change in program flow has occurred, wherein said means for determining includes:
       means for reading a first instruction address of a first instruction;
       means for calculating a length of the first instruction;
       means for adding the first instruction address to the length of the first instruction to determine an expected address;
       means for comparing the expected address to the next instruction address; and
       means for concluding that a chance in program flow has occurred; and
    means for writing a trace record to a trace log if a change in program flow has occurred.

11. A computer readable medium, according to claim 10, wherein the shadowing means comprises a virtual machine layer.

12. A computer readable medium according to claim 10, wherein the trace record contains a number of instructions executed and a displacement to a next trace record.

13. A computer readable medium according to claim 10, wherein said means for writing further comprises means for writing one or more executable instructions into the log.

14. A computer readable medium according to claim 10, further comprising means for writing the trace log to an output file.

15. A computer readable medium according to claim 10, wherein the means for shadowing further comprises:
    means for reading a next instruction address of a next instruction to be executed.

16. A computer readable medium according to claim 15, further comprising:
    means for executing the next instruction;
    means for decoding the next instruction; and
    means for emulating the instruction in software.

17. A computer readable medium according to claim 15, further comprising:
    means for determining if the next instruction address crosses a memory boundary into a new memory region;
    means for determining if the new memory region already exists in a memory log record; and
    means for writing the new memory region to the memory log record.

18. A computer readable medium according to claim 17, further comprising:
    means for determining if the new memory region has changed.

19. A method for tracing operations in an information handling system, comprising the steps of:
    creating a virtual machine layer between an operating system and hardware of the information handling system;
    shadowing identified machine registers during machine transition states using the virtual machine layer, wherein said shadowing step includes the following steps:
       reading a next instruction address of a next instruction to be executed;
       decoding the next instruction; and
       if the next instruction is one of a predetermined set of instructions, emulating the instruction in software;
    determining by a tracing program if a change in program flow has occurred; and
    writing a trace record to a trace log if a change in program flow has occurred.

20. A method for tracing according to claim 19, further comprising the steps of:
    determining if the next instruction address crosses a memory boundary into a new memory region;
    if the next instruction address crosses a memory boundary, determining if the new memory region already exists in a memory log record; and
    if the new memory region does not already exist in the memory log record, writing the new memory region to the memory log record.

21. A method for tracing according to claim 20, further comprising the steps of:

if the new memory region does already exist in the memory log record, determining if the new memory region has changed; and if the new memory region has changed, writing the new memory region to the memory log record.

22. An information handling system, comprising:

one or more processors;

memory means for storing instructions and data for use by the processors;

one or more images of an operating system for controlling the operation of the processors;

an input/output system for communicating information to and from peripheral devices;

at least one system bus connecting the elements of the system for efficient operation;

a virtual machine layer between an operating system and hardware of the information handling system, the virtual machine layer including means for shadowing an identified machine register during processor transition states, wherein said means for shadowing further includes:

means for reading a next instruction address of a next instruction to be executed;

means for executing the instruction;

means for decoding the next instruction; and means for emulating the instruction in software; and reporting means for providing processor transition state information to a requesting process.

23. An information handling system according to claim 22, further comprising:

means for determining if the next instruction address crosses a memory boundary into a new memory region;

means for determining if the new memory region already exists in a memory log record; and means for writing the new memory region to the memory log record.

24. An information handling system according to claim 23, further comprising:

means for determining if the new memory region has changed.

* * * * *

UNITED STATES PATENT AND TRADEMARK OFFICE
CERTIFICATE OF CORRECTION

PATENT NO. : 5,938,778
DATED : August 17, 1999
INVENTOR(S) : Chester Charles John, et al.

It is certified that error appears in the above-identified patent and that said Letters Patent is hereby corrected as shown below:

The title page should be deleted to appear as per attached title page.

The drawing figures consisting of figures 1B, 1C, 3A, 3B and figure 5, should be deleted to appear as per attached sheets.

Signed and Sealed this

Twenty-seventh Day of March, 2001

*Attest:*

NICHOLAS P. GODICI

*Attesting Officer*  *Acting Director of the United States Patent and Trademark Office*

United States Patent [19]

John, Jr. et al.

[11] Patent Number: 5,938,778
[45] Date of Patent: Aug. 17, 1999

[54] SYSTEM AND METHOD FOR TRACING INSTRUCTIONS IN AN INFORMATION HANDLING SYSTEM WITHOUT CHANGING THE SYSTEM SOURCE CODE

[75] Inventors: Chester Charles John, Jr., Round Rock; Robert J. Urquhart, Austin, both of Tex.

[73] Assignee: International Business Machines Corporation, Armonk, N.Y.

[21] Appl. No.: 08/967,651

[22] Filed: Nov. 10, 1997

[51] Int. Cl.⁶ ............................................. G06F 11/00
[52] U.S. Cl. .............................................. 714/45
[58] Field of Search ........................... 395/500, 183.21

[56] References Cited

U.S. PATENT DOCUMENTS

| | | |
|---|---|---|
| 4,205,370 | 5/1980 | Hirtle . |
| 5,073,968 | 12/1991 | Morrison . |
| 5,446,876 | 8/1995 | Levine et al. . |
| 5,454,086 | 9/1995 | Alpert et al. ............ 395/568 |
| 5,560,013 | 9/1996 | Scalzi et al. ............ 395/705 |
| 5,574,937 | 11/1996 | Narain . |
| 5,671,402 | 9/1997 | Nasu et al. ............ 395/500 |
| 5,701,486 | 12/1997 | Gilbertsen et al. ............ 395/704 |

FOREIGN PATENT DOCUMENTS

03280134  12/1991  Japan .

*Primary Examiner*—Kevin J. Teska
*Assistant Examiner*—Ayni Mohamed
*Attorney, Agent, or Firm*—Leslie A.Van Leeuwen; Jeffrey S. LaBaw; Michele A. Mobley

[57] ABSTRACT

The present invention is directed to a system and method for tracing operations in an information handling system without changing the operating system code. Certain machine registers are shadowed during critical machine state transitions (e.g., taking and returning from interrupts), so that the tracing program does not lose control of the system. The system is interrupted before each instruction is executed, and a tracing program determines if a change in program flow has occurred. If a change in program flow has occured, a record is written to a trace log. The record contains the number of consecutive instructions executed before the program flow change, along with a displacement field indicating the number of bytes from the end of the record to the beginning of the next record. Executed instructions are also embedded in the trace log, allowing for high compression ratios and less complex post-processing of the trace data.

24 Claims, 7 Drawing Sheets

Virtual Machine in Intel Architecture normal:

FIG. 1B

Virtual Machine in operation